United States Patent [19] [11] 4,115,665
Giacoppo et al. [45] Sep. 19, 1978

[54] MULTIPLE CIRCUIT INTERRUPTER FOR TELECOMMUNICATION SYSTEM

[75] Inventors: Guglielmo Giacoppo, Milan; Ercole Tres, Cornaredo (MI), both of Italy

[73] Assignee: Societa Italiana Telecomunicazioni Siemens S.p.A., Milan, Italy

[21] Appl. No.: 784,676

[22] Filed: Apr. 5, 1977

[30] Foreign Application Priority Data

Apr. 6, 1976 [IT] Italy .............................. 21955 A/76

[51] Int. Cl.[2] .............................................. H04Q 1/14

[52] U.S. Cl. .................................. 179/98; 179/1 PC; 179/97

[58] Field of Search ................ 179/1 PC, 91 R, 91 A, 179/96, 97, 98, 175, 175.1 R; 339/17 LC, 60 R, 60 M, 211

[56] References Cited

U.S. PATENT DOCUMENTS 2,299,206 10/1942 Berg ...................................... 179/96
3,399,374 8/1968 Pauza et al. .......................... 339/211
3,462,558 8/1969 Selz ........................................ 179/98
3,535,463 10/1970 Trucco .................................. 179/98
3,842,212 10/1974 Miller ................................ 179/91 R
3,919,495 11/1975 Berglund et al. ....................... 179/98
3,927,275 12/1975 Deitch et al. .......................... 179/97

*Primary Examiner*—Kathleen H. Claffy
*Assistant Examiner*—Randall P. Myers
*Attorney, Agent, or Firm*—Karl F. Ross

[57] ABSTRACT

A multiple circuit interrupter, designed to facilitate the selective insertion of testers and other ancillary equipment into lines of a telecommunication system, comprises a body of generally rectangular outline which is receivable in a distribution frame and is split longitudinally into a central section and two lateral sections forming two rows of jacks between them. The jacks are arrayed in a plurality of groups accommodated in respective bosses of the split body projecting from a common base, each boss being engageable by a complementary socket containing a corresponding group of plugs. The bosses and the sockets are asymmetrically profiled to insure proper alignment of the jacks and the plugs.

6 Claims, 3 Drawing Figures

FIG. 2
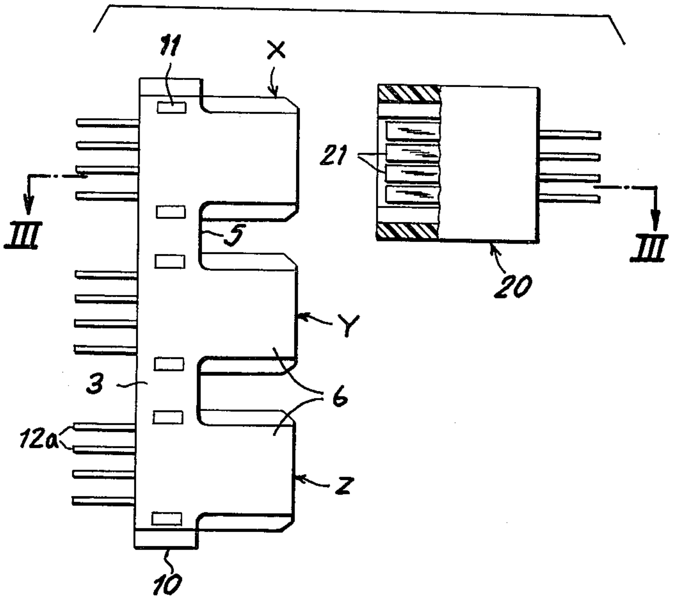
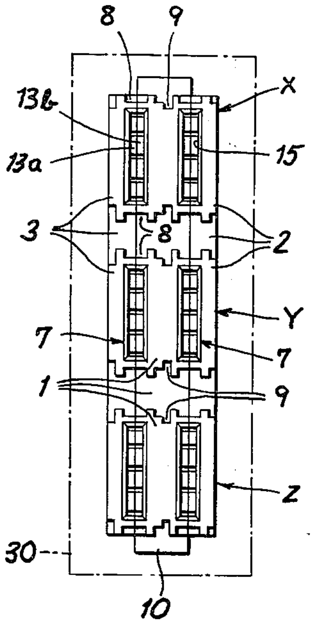
FIG. 1
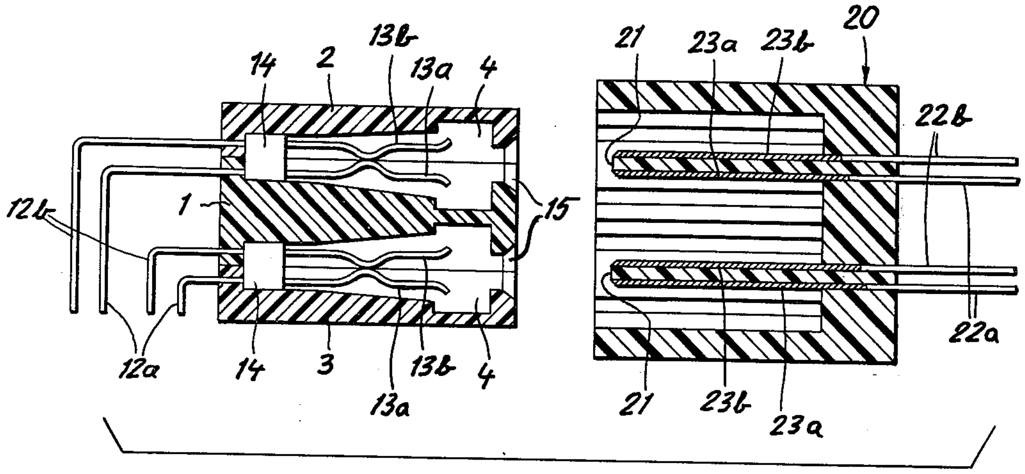
FIG. 3

MULTIPLE CIRCUIT INTERRUPTER FOR TELECOMMUNICATION SYSTEM

FIELD OF THE INVENTION

Our present invention relates to a, multiple circuit interrupter normally interconnecting a certain number of incoming lines of a telecommunication system, within a distribution or switching frame of a telecommunication system, to as many outgoing lines.

BACKGROUND OF THE INVENTION

In copending application Ser. No. 751,890 filed Dec. 17, 1976 by one of us, Guglielmo Giacoppo, there has been disclosed a modular connector unit which can be clipped together with other such units to form such a switching frame. Each connector unit is in the form of a flat, generally prismatic housing with banks of input and output terminals for incoming and outgoing lines and with a seat for a junction box within which extensions of these lines are interconnected. As mentioned in that prior application, these line extensions should have terminations that are readily accessible for the purpose of breaking an existing connection or for the insertion of testing equipment into a line. As further described in that application, the line terminations disposed within the junction box are carried on a block which is frictionally or otherwise received in that box and can be extracted therefrom for replacement purposes.

OBJECT OF THE INVENTION

The object of our present invention is to provide a multiple circuit interrupter of compact construction, generally similar to the contact-carrying insert of the aforementioned junction box, which is receivable in a connector housing of a distribution frame and facilitates the interruption of existing connections as well as the extension of the normally interconnected lines to display, testing or other ancillary equipment.

SUMMARY OF THE INVENTION

In accordance with our present invention, such a multiple circuit interrupter comprises a body of generally rectangular outline which is split into a central section and two lateral sections along surfaces substantially paralleling the major sides of that outline, these sections defining between them a multiplicity of connectors which will be referred to hereinafter as jacks and which are arrayed in two rows parallel to those major sides. One or more transverse incisions, extending across all three sections, define a plurality of identical bosses which encompass respective groups of jacks and can be embraced by a complementary socket fitting around any one of these bosses. The socket carries a group of plugs which are insertable between pairs of normally contacting conductor springs forming part of respective jacks.

Advantageously, pursuant to another feature of our invention, the bosses and the socket have complementary asymmetrical profiles designed to insure an unequivocal alignment between the plugs of the socket and the jacks of the engaged boss.

BRIEF DESCRIPTION OF THE DRAWING

The above and other features of our invention will now be described in detail with reference to the accompanying drawing in which:

FIG. 1 is a front view of a multiple circuit interrupter embodying our invention;

FIG. 2 is a side view of the circuit interrupter of FIG. 1 together with a complementary socket shown partly in section; and FIG. 3 is a cross-sectional view taken on the line III — III of FIG. 2.

SPECIFIC DESCRIPTION

In FIGS. 1 and 2 we have shown a multiple circuit interrupter according to our invention, designed as a modular unit, which has a body of generally rectangular outline (as seen in FIG. 1) longitudinally split into a central section 1 and two lateral sections 2 and 3 of the same length. Between these central and lateral sections there are formed two rows 7 of recesses 4 located within bosses 6, also of generally rectangular outline, which are separated from one another by transverse incisions 5. Each recess 4, as best seen in FIG. 3, accommodates a respective jack comprising a base 14 and two normally contacting conductor springs **13*a*, 13*b* projecting therefrom toward the opposite end of the recess which has an aperture 15 for the insertion of a mating plug disposed within a socket 20 having lower and upper wall portions receivable in incisions 5. Extensions 12*a*, 12*b* of incoming and outgoing lines, passing through the nonconductive body 1–3 and base 14, are tied to conductor springs 13*a* and 13*b* of respective jacks so as to be normally interconnected thereby. The plugs of socket 20, which is also made from nonconductive material, comprise tongues 21 integral with that socket flanked by conductor strips 23*a*, 23*b* which come into contact with respective springs 13*a*, 13*b* upon introduction of these plugs through the apertures 15 into mating engagement with the respective jacks. Conductors 22*a*, 22*b* extending from strips 23*a*, 23*b*** lead to external testing circuits or other monitoring devices not shown.

In the illustrated embodiment, the three bosses 6 encompass respective groups of jacks designated X, Y and Z, each group consisting of two rows of four jacks each. The lines connected by these eight jacks may serve, for example, for the transmission of the several bits of a PCM channel together with signals of an associated supervisory channel.

The bosses 6 are shown to have profiles of asymmetrical shape including guide grooves 8 aligned with rows 7 and notches 9 offset from the centerline of body 1–3 and located at the end faces of that body as well as along the boundaries of incisions 6. These profiles are complementary to that of socket 20 which, therefore, can be fitted onto each boss in only one predetermined position whereby its plugs are unequivocally aligned with the corresponding jacks. Lugs 10 integral with central body section 1, projecting from the minor sides of the rectangular outline of the circuit interrupter, are receivable in corresponding recesses of a connector housing 30 forming part of a switching or distribution frame of the type described in copending application Ser. No. 751,890 referred to above.

The three body sections 1–3 are held together by throughgoing fasteners, preferably metal clips as shown at 11 in FIG. 2. These fasteners are necessarily offset from the recesses 4 containing the jacks.

If the outgoing conductors **22*a*, 22*b* of a given plug are open-circuited, the insertion of that plug will simply break the connection existing between the lines 12*a* and 12*b* served by the corresponding jack. Either of the conductors 22***a*, 22*b* of that plug can then be used to complete a test circuit through the corresponding line 12*a* or 12*b*, or a single test circuit may be bridged across both conductors to ascertain the continuity of the signal path constituted by the two lines. The angular bending of lines 12*a*, 12*b* shown in FIG. 3 facilitates their connection to a printed-circuit board forming part of frame unit 30 as described in application Ser. No. 751,890.

We claim:

1. A multiple circuit interrupter facilitating the selective insertion of ancillary equipment into a multiplicity of lines of a telecommunication system, comprising:

a body of generally rectangular outline split into a central section and two lateral sections along surfaces substantially paralleling the major sides of the rectangle, said sections defining between them a multiplicity of jacks arrayed in two rows parallel to said major sides, said body having at least one transverse incision extending across said central and lateral sections whereby a plurality of identical bosses of generally rectangular outline are formed which encompass respective groups of said jacks, each jack including a pair of conductor springs normally in contact with each other; and at least one complementary socket fitting around any one of said bosses, said socket carrying a group of plugs insertable between the conductor springs of the group of jacks of the engaged boss with a wall portion of said socket received in said incision.

2. A circuit interrupter as defined in claim 1 wherein the outline of said bosses forms an asymmetrical profile along a boundary of said incision for insuring an unequivocal alignment between any group of jacks and said group of plugs.

3. A circuit interrupter as defined in claim 1 wherein said body is provided with surface formations at the minor sides of the rectangle engageable with mating formations of an associated distribution frame.

4. A circuit interrupter as defined in claim 3 wherein said surface formations include a pair of lugs on said central section projecting beyond said lateral sections.

5. A circuit interrupter as defined in claim 1 wherein said sections are interconnected by throughgoing fasteners at locations offset from said jacks.

6. A circuit interrupter as defined in claim 5 wherein said sections consist of nonconductive material, said fasteners being metal clips.

* * * * *